United States Patent [19]

Mikami et al.

[11] 4,293,574
[45] Oct. 6, 1981

[54] PROCESS FOR PREPARING MAYONNAISE-LIKE FOODS

[75] Inventors: Yasuo Mikami, Yokohama; Hiroshi Kanda, Zushi; Akio Uno, Yokohama, all of Japan

[73] Assignee: The Nisshin Oil Mills, Ltd., Tokyo, Japan

[21] Appl. No.: 123,250

[22] Filed: Feb. 21, 1980

[30] Foreign Application Priority Data

Aug. 10, 1979 [JP] Japan ................. 54-101306

[51] Int. Cl.³ ............................................. A23L 1/24
[52] U.S. Cl. ........................................ 426/46; 426/63; 426/605; 426/656; 426/613
[58] Field of Search ............... 426/656, 46, 613, 589, 426/605, 52, 63

[56] References Cited

U.S. PATENT DOCUMENTS

| | | | |
|---|---|---|---|
| 3,864,500 | 2/1975 | Lynn | 426/613 |
| 3,865,956 | 2/1975 | Fukushima | 426/613 |
| 3,867,560 | 2/1975 | Menzi et al. | 426/613 |
| 3,892,873 | 7/1975 | Kolen | 426/613 |
| 4,119,733 | 10/1978 | Hsieh | 426/613 |
| 4,163,808 | 8/1979 | DePaolis | 426/613 |

*Primary Examiner*—Jeanette M. Hunter
*Attorney, Agent, or Firm*—Sughrue, Mion, Zinn, Macpeak and Seas

[57] ABSTRACT

Mayonnaise-like foods not containing eggs are obtained by solubilizing an alcohol-denatured soybean protein with protease, separating insoluble materials to refine the soybean protein and emulsifying the refined soybean protein together with edible oils, vinegars, seasonings and others.

3 Claims, No Drawings

PROCESS FOR PREPARING MAYONNAISE-LIKE FOODS

BACKGROUND OF THE INVENTION

This invention relates to a process for preparing mayonnaise-like foods by using a specifically refined soybean protein instead of eggs as an emulsifier.

Mayonnaise-like foods used herein mean mayonnaise containing soybean proteins instead of eggs as an emulsifier.

An increase in cholesterol in blood owing to overeating animal foods has become a serious problem and therefore, the trend of wanting foods free of cholesterol for health is rising yearly.

In conventional mayonnaise, eggs containing a large amount of cholesterol are used as an emulsifier. Accordingly, preparing mayonnaise-like foods by using soybean proteins free of cholesterol instead of eggs is to just meet the needs of the times.

Under such circumstances, there have been, hitherto, provided mayonnaise-like foods using soybean proteins, for example, by a method of using a separated soybean protein (Reported at The 5th International Congress of Food Science and Technology, Sept. 17-22, 1978, Kyoto, Japan) or a method of subjecting soybean proteins to lactic fermentation and using the resulting lactic acid instead of vinegar (Japanese Patent Publication No. 51-32705). These methods are not sufficiently satisfied for the following reasons.

First, the soybean protein, in spite of effecting purification, deodorization and decoloration is not flavorous sufficiently to substitute for eggs and therefore, exhibits a flavor and color peculiar to soybean, even though subjected to seasoning. Since mayonnaise is used in a manner of putting on, dressing with or spreading on various foods, it is necessary to raise the taste of the food without losing its inherent flavor.

Second, since the conventional soybean protein has an emulsifying power remarkably reduced at such an acidic pH as in mayonnaise, the resulting food products have a disadvantage of being inferior in an emulsification stability to the conventional mayonnaises from eggs.

SUMMARY OF THE INVENTION

An object of this invention is to provide a process for the preparation of mayonnaise-like foods using a specifically refined soybean protein instead of eggs as an emulsifier.

Another object of this invention is to provide mayonnaise-like foods using a refined soybean protein, having a flavor and organoleptic properties equal to those of the conventional mayonnaise using eggs and improved in an emulsification stability.

The foregoing can be attained by preparing mayonnaise-like foods in a process which comprises solubilizing an alcohol-denatured soybean protein with protease till a solubility of protein by a 10% aqueous trichloroacetic acid solution has reached about 15-35% by weight, separating water-insoluble materials to obtain refined soybean proteins and emulsifying the refined soybean protein together with edible oils, vinegars, seasonings and others.

DETAILED DESCRIPTION OF THE INVENTION

According to this invention, with the alcohol denaturation the soybean protein is refined to one free of an odor and color tone peculiar to soybean and mayonnaise-like foods prepared therefrom are by no means inferior in a flavor and organoleptic properties to the conventional mayonnaise starting from egg. Further, the synergistic effect of the alochol denaturation and the solubilization treatment by enzymolysis with protease results in a remarkably increasing of an emulsifying ability of protein, particularly at an acidic pH. The alcohol denaturation used herein means that the molecular structure of protein is converted to a water-insoluble condition by washing with alcohols. A higher level in the denaturation degree indicates a lower solubility of protein in water and a lower denaturation degree indicates a higher solubility.

It is known that an emulsifying ability is increased to some extent by hydrolyzing partially soybean proteins with enzyme.

Surprisingly, it has now been found that when soybean protein having the solubility reduced by the alcohol denaturation is solubilized with enzymolysis, an emulsifying ability and emulsification stability are remarkably and unexpectedly improved.

The starting soybean protein which may be used in this invention may be a defatted soybean flour or soybean proteins prepared therefrom, such as an extracted soybean protein or an isolated soybean protein.

The starting soybean proteins are washed with alcohols, preferably a water containing alcohol. Examples of alcohols include methanol, ethanol and propanol and ethanol is preferred. With this washing the flavor and color of the protein are markedly reduced.

A higher level in the denaturation degree is preferred because it has a favorable influence upon the subsequent emulsification stability.

The alcohol washing is carried out in the conventional method by using an alcohol concentration of about 50-80% (W/W) and a weight ratio of solvent to soybean protein of about 5-fold to 20-fold.

The washing temperature is, preferably below a boiling point at the aqueous alcohol concentration. Also, an alcohol vapor may be used.

The proteins thus obtained are substantially free of a taste and odor peculiar to soybean and improved in color, but the solubility is decreased by the alcohol denaturation and therefore, can not be used for the preparation of mayonnaise-like foods. Next, the alcohol-denatured proteins are added with water and dispersed, which are then subject to a pH adjustment and thereafter, an acidic, neutral or alkaline protease such as pepsin, Bioprase (trade name by Nagase Sangyo, Japan) papain, trypsin and Alkalase (trade name by Novo Comp., Denmark) is added to effect enzymolysis while stirring slowly. At this time the pH and temperature are, preferably an optimum pH of the enzyme used and an optimum temperature thereby to promote an enzyme reaction. For adjusting a pH acids or salts for foods, e.g. hydrochloric acid, acetic acid, sodium hydroxide, ammonia water and sodium bicarbonate may be used.

By way of example using pepsin as an enzyme, a pH is preliminarily adjusted by hydrochloric acid to the optimum pH, i.e. about 2.0 and then an enzyme preparation is added to commence enzymolysis. After having reached the desired level of enzymolysis, sodium hydroxide is added for neutralization and then the enzyme is inactivated by heating.

The enzymatic reaction is stopped when a solubility of protein by a 10% aqueous solution of trichloroacetic acid (hereinafter referred to as "a 10% TCA solubilization rate") has reached about 15–35% by weight, preferably 20–30% by weight.

A 10% TCA solubilization rate may be measured as follows:

2 g of a sample of protein powders treated with enzyme are dissolved with 48 g of water and 50 g of a 20% aqueous TCA solution are added thereto and vibrated sufficiently. The resulting precipitates are centrifuged and then, 10 g of the supernatant solution are sampled. Nitrogen is measured in accordance with Kjeldahl method.

On the other hand, total nitrogen of the protein powder sample used is measured and a 10% TCA solubilization rate is calculated by the following formula.

10% TCA Solubilization Rate (%) = Nitrogen in 10 g of the Supernatant × 10 (mg)/Total Nitrogen in 2 g of the Sample (mg) × 100

If the TCA solubilization rate is too lower, proteins made insoluble by the alcohol denaturation can not be recovered in the subsequent extraction and filtration step so that a yield of refined protein is reduced and also an emulsification stability of food products is not improved.

On the other hand, if the TCA solubilization rate exceeds 35% by weight, bitter peptides are formed in the enzymolysis products so that they have undesirable influences upon a flavor of mayonnaise-like foods. As mentioned above, the TCA solubilization rate is, preferably about 15%–35%, though it may vary depending on the type of the enzyme used.

The inactivation of enzyme is conveniently carried out by heating, particularly using a plate type heat exchanger in a short time at a high temperature.

Next, materials insoluble in water are filtered off to obtain a solution of refined soybean protein, to which edible oils, vinegars and seasonings may be directly added and emulsified together. The refined soybean protein solution thus obtained or powders prepared therefrom by drying are improved in a flavor and color tone and have a good emulsification performance, particularly at an acidic pH so that mayonnaise-like foods are prepared with a good emulsification stability.

By way of example, mayonnaise-like foods are conveniently prepared from the refined soybean protein as follows:

To a solution of refined soybean protein or one obtained by dissolving its powders again in water are added condiments such as salt, sodium glutamate, nucleic acid type seasonings, sugar and others and if desired, pastes are further dispersed and dissolved therein. Natural coloring matters, oil-soluble spices and herbs and tocopherol may be preliminarily dissolved in an edible oil. The soybean protein solution and edible oil thus obtained are emulsified by means of an emulsifier such as puddle mixer, agitator, Homomixer (the trade name by Tokushukika Kogyo, Japan) or colloid mill.

The resulting emulsion may be subject to colloid mill to further advance homogenization. Mayonnaise-like foods thus obtained are free of flavor peculiar to soybean and have a plain taste and a good emulsification stability.

According to this invention, mayonnaise-like foods using no eggs are provided and therefore, there is no need to feel misgivings about cholesterol as opposed to the conventional mayonnaises.

EXAMPLE 1

20 kg of a slightly denatured, defatted soybean were washed with 200 kg of an aqueous 60 W/W % solution of ethanol is a sealed tank at 50° C. for 30 minutes. After filtration 32 kg of cake were obtained and transferred into a pressure-reduced drier. After drying at 70° C. 13.5 kg of a powdered, concentrated soybean protein were obtained. Analysis on this product was as follows:

Water: 6.5%
Protein (based on dry): 67%
Nitrogen Solubility Index (NSI): 11.0%

Next, the whole amount of the above product was added to 150 l of warm water (60° C.) in a tank provided with jacket and dispersed while stirring. Ammonia water was added to adjust a pH to 9.0 and temperature of the solution was elevated to 55° C. and maintained at this temperature.

When 50 g of Bioprase (20,000 U) were added and reacted at 55° C. for two hours, a pH was lowering slowly up to 7.5 and a 10% TCA solubilization rate was 20%. This solution was heated by means of a plate type heat exchanger and cooled. The highest temperature of the solution having reached was 120° C. After centrifuging with a decanter, 120 l of a solution of 7.3% in solid content were obtained, of which 5.0 l were sampled (Sample A) and the remainder were concentrated and spray-dried to obtain 7.5 kg of refined soybean protein (Sample B). The sample B in form of powders is free of a beany flavor, having a bright white color and a high water-solubility and analysis on this material is as follows:

Moisture: 7.0%
Protein (based on dry, hereinafter referred to as "D/B"): 83.5%
NSI: 95%
10% TCA Solubilization Rate: 26%

Each of 4.0 l of a protein solution having a 5% concentration was prepared from Samples A and B. 100 g of sugar, 200 g of salt and 50 g of seasonings mixture were added thereto and dissolved. Next, 5 kg of soybean salad oil were added slowly while maintaining the temperature at 30° C. and emulsified sufficiently. Then, 1.0 kg of vinegar was added slowly and emulsified. Finally, the finishing was conducted using a colloid mill to obtain mayonnaise-like foods A and B. As for these two mayonnaise-like foods, the emulsification state and flavor were both good as set forth in Table 1.

TABLE 1

| Samples | Emulsification State | Viscosity* cp | Flavor |
|---------|---------------------|---------------|--------|
| A | Stable | 45,000 | Good |
| B | Stable | 45,000 | Good |

*According to Brookfield Viscometer

REFERENCE EXAMPLES 1 AND 2

Defatted soybeans were subjected to extraction with water by the conventional method to remove the residues and then, whey was removed by an acid precipitation, followed by neutralization and heat treatment. Thereafter, spray-drying was carried out to obtain separated soybean protein powders (Reference Ex. 1).

Next, a part of said separated soybean protein powders was dissolved in water to prepare a 5 weight % solution. Papain (The Pharmacopoeia of Japan) was added to this solution and enzymolysis was conducted at pH=7, 50° C. for three hours. After heat sterilization, spray-drying was carried out to obtain an enzymolyzed, isolated soybean protein (Reference Ex. 2).

Analysis on each of the above two products is set forth in Table 2.

TABLE 2

| No. | Protein | Water Content | Raw Protein D/B | NSI | 10% TCA Solubilization Rate |
|---|---|---|---|---|---|
| Ref. Ex. 1 | Separated soybean protein powders | 6.0% | 89% | 93% | 1.3% |
| Ref. Ex. 2 | Enzymolyzed separated soybean protein powders | 6.5% | 88% | 95% | 27.0% |

Using these two soybean proteins, mayonnaise-like foods were prepared in the same manner as in Example 1.

A comparison with the food product of Example 1 was made as set forth in Tables 3 and 4. Table 3 shows qualities of mayonnaise-like foods just after preparation and Table 4 shows the results of forced degradation test on food products, in which an emulsification stability is evaluated by allowing to stand at 40° C. during the indicated period of time.

TABLE 3

| Run No. | Flavor | Chewiness | Stability just after preparation | Viscosity cp |
|---|---|---|---|---|
| Reference Ex. 1 (Separated soybean protein powders) | Peculiar taste | Feel rough in some degree to the tongue | Good | 60,000 |
| Reference Ex. 2 (Enzymolyzed separated soybean protein powders) | Peculiar taste | Fine | Good | 50,000 |
| Example 1 (Refined soybean protein powders) | Flavorous | Fine | Good | 45,000 |

TABLE 4

Forced Degradation Test, at 40° C. (Emulsification Stability)

| Run No. | After one week | After two weeks | After 3 weeks | After 4 weeks |
|---|---|---|---|---|
| Reference Ex. 1 (Separated soybean protein powders) | Oil off | — | — | — |
| Reference Ex. 2 (Enzymolyzed, separated soybean protein powders) | Good | Oil off | — | — |
| Example 1 (Refined soybean protein powders) | Good | Good | Good | Good |
| Mayonnaise from egg | Good | Good | Good | Good |

It is clear from Tables 3 and 4 that mayonnaise-like foods prepared from the conventional separated soybean protein powders and the further enzymolyzed, isolated soybean protein powders are inferior in the flavor and emulsification stability to the food product of Example 1.

The refined soybean proteins obtained by enzymolyzing the alcohol-denatured soybean protein according to this invention are remarkably improved in the flavor, organoleptic properties and emulsification stability.

Next, a blindfold taste test was effected on Mayonnaise-like food A of Example 1 and a commercial available mayonnaise from egg. Twenty panels tasted mayonnaise put on the vegetable salad. The results are set forth in Table 5.

TABLE 5

| Panels who prefer Mayonnaise-like food A : | 9 |
|---|---|
| Panels who prefer the commercial available mayonnaise : | 11 |

The foregoing shows that Mayonnaise-like food of Example 1 is very flavorous.

EXAMPLE 2

5 kg of defatted soybean were washed with a 10-fold ratio of a 75 W/W % aqueous alcohol at 55° C. and filtered off. The above washing and filtering were repeated twice. After drying at room temperature, 3.4 kg of concentrated soybean protein were obtained. Analysis on this product was as follows:
Water: 8.0%
Raw Protein (D/B): 69.8%
NSI: 14%

Next, the concentrated soybean protein was treated in the same manner as in Example 1 with enzyme for 30 minutes (Sample A), two hours (Sample B) and five hours (Sample C), respectively and then the enzyme was inactivated by heat treatment.

A 10% TCA solubilization rate was as set forth in Table 6.

TABLE 6

|  | 10% TCA Solubilization Rate |
|---|---|
| Sample A | 10% |
| Sample B | 25% |
| Sample C | 41% |

Next, centrifuging was carried out and each of the refined soybean protein solution was obtained (Samples A', B' and C'). Yield and flavor on each samples were as indicated in Table 7.

TABLE 7

|  | Amount of Solution | Solid Content | Protein Content | Yield of Solid Content per kg of Concentrated Soybean Protein | Flavor |
|---|---|---|---|---|---|
| Sample A' | 780 g | 5.6% | 4.0% | 44% | Good |

TABLE 7-continued

| | Amount of Solution | Solid Content | Protein Content | Yield of Solid Content per kg of Concentrated Soybean Protein | Flavor |
|---|---|---|---|---|---|
| Sample B' | 830 g | 7.0% | 5.6% | 58% | Good |
| Sample C' | 870 g | 7.9% | 6.8% | 69% | Slightly bitter |

Then, water was added to Samples A', B' and C' so as to form a protein solution of 4% concentration for the preparation of mayonnaise-like foods. To 2.3 l of this solution were added 100 g of sugar, 200 g of salt, 20 g of sodium glutamate, 2 g of nucleic acid type condiments, 20 g of yeast extract and 11 g of tamarind seed gum, which were then fed into a jacket-equipped tank and dissolved under stirring. The temperature was elevated to 90°-95° C. and maintained for 20 minutes and thereafter, lowered to 30° C.

Into 5.5 kg of salad oil were dissolved 40 g of carrot oil, 5 g of mustard oleoresin and 5 g of tocopherol. The salad oil thus obtained was added to the above protein solution in the tank over five minutes while stirring by means of an impeller type stirrer and then, the stirrer was substituted by Homomixer to effect emulsification.

Next, 0.6 kg of apple vinegar with 100 grains were added slowly under stirring, which were then treated by a colloid mill to prepare mayonnaise-like foods A, B and C.

The flavor of these products and the results of forced degradation test are set forth in Table 8.

TABLE 8

| Mayonnaise-like Foods | Flavor | Forced Degradation Test, at 40° C. | | |
|---|---|---|---|---|
| | | Just before test | After one month | After 1.5 months |
| A | Good | Good | Oil rises to the | Oil off |
| B | Good | Good | Good | Good |
| C | Slightly bitter | Good | Good | Oil off |

Tables 6 and 8 show that Sample A having as low a 10% TCA solubilization rate as 10% is reduced in a yield of refined soybean protein and inferior in an emulsification stability of mayonnaise-like foods. On the contrary, Sample C having as high a 10% TCA solubilization rate as 41% is inferior in a taste because of being slightly bitter and the oil from the food product bleeds to the surface after 1.5 months at 40° C. Sample B according to this invention has a good flavor and emulsification stability.

What is claimed is:

1. A process for preparing a mayonnaise food which comprises solubilizing an alcohol-denatured soybean protein with protease until the solubility of the protein in a 10% aqueous solution of trichloroacetic acid has reached about 15–35% by weight, separating water-insoluble materials to obtain refined soybean proteins and emulsifying the refined soybean proteins together with edible oils, vinegars, seasonings.

2. The process of claim 1 wherein the alcohol-denaturation of soybean protein is effected by washing with a water-containing alcohol of a concentration of about 50–80% by weight.

3. The process of claim 1 wherein the solubility of the protein in a 10% aqueous trichloroacetic acid solution is within the range of 20–30% by weight.

* * * * *